United States Patent
Tazartes et al.

(10) Patent No.: US 8,203,718 B2
(45) Date of Patent: *Jun. 19, 2012

(54) PHOTONIC CRYSTAL BASED SENSOR OR MODULATOR

(75) Inventors: Daniel A. Tazartes, West Hills, CA (US); Kenneth D. Marino, Brentwood, CA (US)

(73) Assignee: Northrop Grumman Guidance and Electronic Corporation, Inc., Woodland Hills, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/029,059

(22) Filed: Feb. 16, 2011

(65) Prior Publication Data

US 2011/0170109 A1   Jul. 14, 2011

Related U.S. Application Data

(62) Division of application No. 11/528,133, filed on Sep. 27, 2006, now Pat. No. 7,924,427.

(51) Int. Cl.
*G01B 9/02* (2006.01)
*G01C 19/72* (2006.01)

(52) U.S. Cl. ....................................... 356/477
(58) Field of Classification Search .............. 356/477, 356/481, 460; 385/12
See application file for complete search history.

(56) References Cited

U.S. PATENT DOCUMENTS

| | | | |
|---|---|---|---|
| 5,526,449 A * | 6/1996 | Meade et al. | 385/14 |
| 5,781,301 A | 7/1998 | Ruffin | |
| 6,566,155 B1 | 5/2003 | Numai | |
| 6,873,777 B2 * | 3/2005 | Bourelle | 385/129 |
| 6,885,456 B2 | 4/2005 | Hashimoto | |
| 6,956,651 B2 * | 10/2005 | Lackritz et al. | 356/445 |
| 7,158,711 B2 * | 1/2007 | Tokushima | 385/131 |
| 7,289,221 B2 * | 10/2007 | Wang et al. | 356/477 |
| 7,307,732 B2 * | 12/2007 | Beausoleil | 356/477 |
| 7,412,127 B2 * | 8/2008 | Suh et al. | 385/27 |
| 7,613,367 B2 * | 11/2009 | Levy et al. | 385/13 |
| 7,911,620 B2 * | 3/2011 | Digonnet et al. | 356/460 |
| 7,924,427 B2 * | 4/2011 | Tazartes et al. | 356/460 |
| 2003/0011775 A1 * | 1/2003 | Soljacic et al. | 356/450 |
| 2003/0030814 A1 | 2/2003 | Osinski et al. | |
| 2004/0179803 A1 * | 9/2004 | Bourelle | 385/129 |
| 2004/0263856 A1 | 12/2004 | Willig et al. | |
| 2005/0084213 A1 * | 4/2005 | Hamann et al. | 385/40 |
| 2006/0066866 A1 * | 3/2006 | Wang et al. | 356/481 |
| 2006/0103851 A1 | 5/2006 | Nathan et al. | |
| 2006/0104586 A1 * | 5/2006 | Tokushima | 385/129 |
| 2006/0145063 A1 | 7/2006 | Steinberg et al. | |
| 2007/0263224 A1 | 11/2007 | Keyser et al. | |
| 2008/0030741 A1 * | 2/2008 | Digonnet et al. | 356/483 |
| 2008/0074673 A1 * | 3/2008 | Tazartes et al. | 356/470 |
| 2010/0039649 A1 * | 2/2010 | Digonnet et al. | 356/460 |
| 2010/0278487 A1 * | 11/2010 | Tokushima | 385/43 |

OTHER PUBLICATIONS

Steinberg, Ben Zion; "Rotating Photonic Crystals: A Medium for Compact Optical Gyroscopes"; Physical Review E 71, 056621; The American Physical Society; pp. 056621-056627; May 2005.

* cited by examiner

*Primary Examiner* — Michael A Lyons

(57) ABSTRACT

A gyroscope having photonic crystals for sensing rotation uses the Sagnac effect to determine angular motion. The gyroscope comprises a photonic crystal capable of guiding counter-propagating light beams in a closed path. A light source, coupling, and detection apparatus permits detection of phase changes between the counter-propagating beams, thereby permitting measurement of angular rotation. The photonic crystal comprises a periodic structure of pillars and voids which creates a photonic bandgap waveguide within which light waves in the proper wavelength range propagate with low loss.

11 Claims, 4 Drawing Sheets

PHOTONIC CRYSTAL BASED SENSOR OR MODULATOR

CROSS-REFERENCE TO RELATED APPLICATION

This application is a divisional of application Ser. No. 11/528,133 filed Sep. 27, 2006 now U.S. Pat. No. 7,924,427 for Photonic Crystal Based Rotation Services.

BACKGROUND OF THE INVENTION

1. Field of the Invention

The invention relates generally to sensors or modulators. More particularly, the invention relates to sensors or modulators that use optical medium.

2. Description of the Related Art

Those concerned with the development of rotation sensors have long recognized the need for inexpensive solid state optical rotation sensors. The present invention fills this need.

A classic rotation sensing apparatus, for example consists of two spinning mass gyroscopes mounted on perpendicular axes of a three axis gimbaled platform. The gyroscopes stabilize the platform in inertial space. The angular position of the body housing the apparatus can then be measured at the gimbals. Digital computers create an alternative to the gimbaled platform, and angular position can be calculated by integrating angular rate information derived from torque measurements on spinning mass gyroscopes. Rotation sensing devices that feature spinning mass gyroscopes have drawbacks related to wear, maintenance and start-up time. Weight, size, precession, and cost further limit the use of a spinning mass gyroscope. In recent years, gyroscopes based on other technologies have replaced spinning mass gyroscopes in many applications.

The ring laser gyroscope has become the gyroscope of choice for many applications because it requires no moving parts. A ring laser gyroscope consists of a transmission path in the form of a two dimensional polygon, often a triangle, or rectangle. Mirrors at each of the corners of the polygon reflect laser light down the legs of the polygon forming a ring-like transmission path. Laser light is generated in the transmission path using an electrical discharge applied to a suitable gas mixture. Due to symmetry, laser light propagates through the transmission path in both directions.

The Sagnac effect is used to determine rotational rate. When the gyroscope is rotating around an axis normal to the transmission path, laser light traveling through the transmission medium in opposite directions will have different path lengths and the frequencies of the two standing waves will differ. The beat between these two frequencies is measured, giving a result proportional to the rotation rate of the device. Ring laser gyros offer some improvements in cost, accuracy and reliability over classic spinning mass gyroscopes but still suffer from many drawbacks including the need for quality glass machined cavities, precision mirrors, high voltage lasers, and inert gases. Weight, size, cost and complexity also limit the applications for which a ring laser gyroscope would be a suitable choice.

Another optical gyroscope is the fiber optic gyroscope. The fiber optic gyroscope is similar to the ring laser gyroscope in that it uses an optical transmission path (fiber optic cable) to exploit the Sagnac effect. An optical coupler (a beam splitter) is used to introduce coherent light into both ends of a coiled optical fiber. When the optical gyroscope is rotated about an axis normal to the coils the path length of light traveling in one direction will be longer than the path length of light traveling in the other direction inducing an apparent phase shift in the light arriving at the ends of the fiber. A phase interferometer located at the ends of the fiber combines the light. Through appropriate processing of the intensity of the combined light, the rotation rate of the fiber may be determined. Fiber optic gyroscopes are generally less expensive, smaller, and lighter than ring laser gyroscopes. Weight, size, and cost also limit the applications suitable for fiber gyroscopes.

Some efforts have been made to incorporate gyroscopes into solid state electronics using Micro-Electromechanical Systems (MEMS) technologies. Some MEMS gyroscopes include the piezoelectric gyroscope, the tuning fork gyroscope and the vibrating wheel gyroscope. They are characterized by a vibrating element that exploits the Coriolis force. These gyroscopes are light in weight and less costly than other conventional gyroscopes but in general suffer from larger drift rates, higher failure rates and are less accurate making them unsuitable for many applications. Although, MEMS technologies offer considerable cost savings over other technologies, their accuracies and inherent reliance on vibratory motion preclude their use for gyroscopes for most applications.

Those concerned with the development of gyroscopes have long recognized the need for ever smaller, more accurate and inexpensive gyroscopes. The present invention significantly advances the prior art by offering a gyroscope based on a relatively new technology that enables the mass production of small accurate gyroscopes. The waveguides produced by this new technology find ready application as gas sensors, pressure sensors, and light modulators when placed into a Mach-Zehnder interferometer configuration.

SUMMARY OF THE INVENTION

The present invention, comprises a photonic crystal arranged to guide light of a certain wavelength range along a pre-defined closed path. The photonic crystal is characterized by a periodic structure modified by deliberate "imperfections" (pillars) which form a waveguide. The periodic structure may be uniform rows of pillars and the imperfections could be "missing" pillars in the appropriate arrangement. The section where pillars are missing forms the waveguide. The reflective properties of the periodic pillars are used to guide and confine coherent or laser light through the waveguide.

A beam of light is split into a first beam traveling through the waveguide in one direction and a second beam of light traveling through the waveguide in an opposite direction. The phase angles or the frequencies of the first and second beams are compared at the end or the ends of the waveguide. They will be identical if the waveguide is not rotating around an axis normal to the plane of the waveguide transmission path. If the waveguide is rotating, the frequency and phase will be proportionally offset by the rotation rate about the axis. In this way the gyroscope senses rotation rate about the axis normal to the gyroscope.

The gyroscope can be manufactured using conventional semiconductor equipment and manufacturing techniques. The use of standard equipment to mass produce a solid state optical gyroscope offers considerable cost advantages over the conventional ring laser gyroscope and fiber optic gyroscope. The gyroscope has no moving parts making it inherently more reliable. The inherent properties of photonic crystals also allow "hairpin" turns in the light path and offer more flexibility in light path topology design.

The gyroscope also offers an alternative to current MEMS technologies. The gyroscope uses the Sagnac effect rather than the Coriolis effect used by MEMS gyroscopes, obviating the need for a vibrating member. This makes the gyroscope less susceptible to external shock or vibration. When used in conjunction with an inexpensive light source the gyroscope requires very little power.

In a Mach-Zehnder interferometer configuration, two separate light paths in the waveguide direct the coherent light to a coupler/combiner. Placing a compliant material in one light path will allow pressure detection. Placing a gap in one light path will allow gas sensing. Using materials that are sensitive to electric fields for the pillars in the waveguides that form one of the light paths, allows light modulation.

BRIEF DESCRIPTION OF THE DRAWINGS

The exact nature of this invention as well as its objects and advantages will be readily understood upon consideration of the following specification as related to the attendant drawings wherein like reference numerals throughout the drawings indicate like parts, and wherein.

DESCRIPTION OF THE PREFERRED EMBODIMENTS

Figure 1:
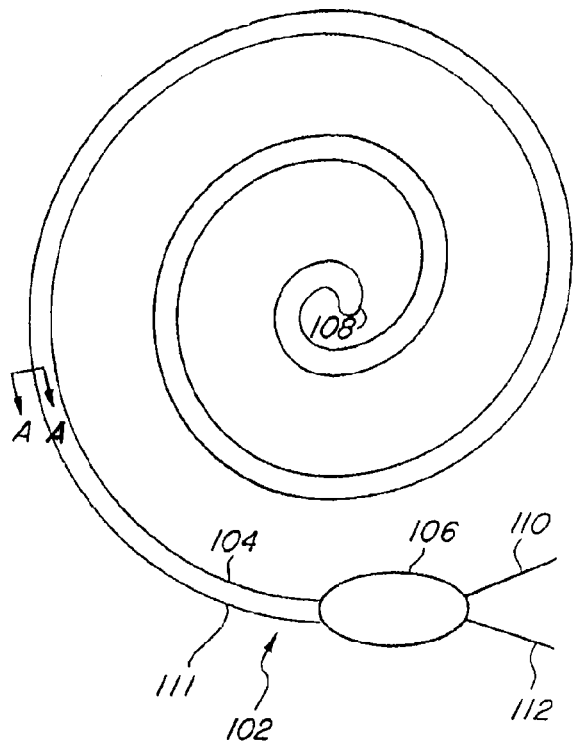
FIG. 1 is schematic illustration of a top view of a preferred embodiment of the present invention.

FIG. 1 shows an elongated two dimensional photonic crystal (hereinafter waveguide) 102 wrapped in a double spiral in a single plane. A first spiral 104 extends from a coupler 106 to a midpoint 108 and is characterized by a decreasing radius of curvature. A second spiral 111 extends from the coupler 106 to the midpoint 108 in a winding almost parallel to the first spiral. A first light path 110 guides coherent or laser light into the coupler. A second light path 112 guides light out of the coupler.

The first and second light paths 110, 112 are preferably composed of optical fiber for conducting coherent light. Air or an inert gas may be used for the laser light. However, any light translucent medium may be used.

Coupler 106 is a coupler acting as a beam splitter for light introduced into the waveguide 102 and a combiner for light departing the waveguide. However, the coupler may comprise a number of different optical devices such as optical beam splitters, combiners, circulators or Bragg gratings, for example.

The midpoint 108 is characterized by a sharp turn in the waveguide. The waveguide 102 may feature pillars (explained hereinafter) that propagate light around turns with very little loss of efficiency or scattering. Alternately, the midpoint 108 may be manufactured with a reflecting structure such as a Bragg grating.

Figure 2:
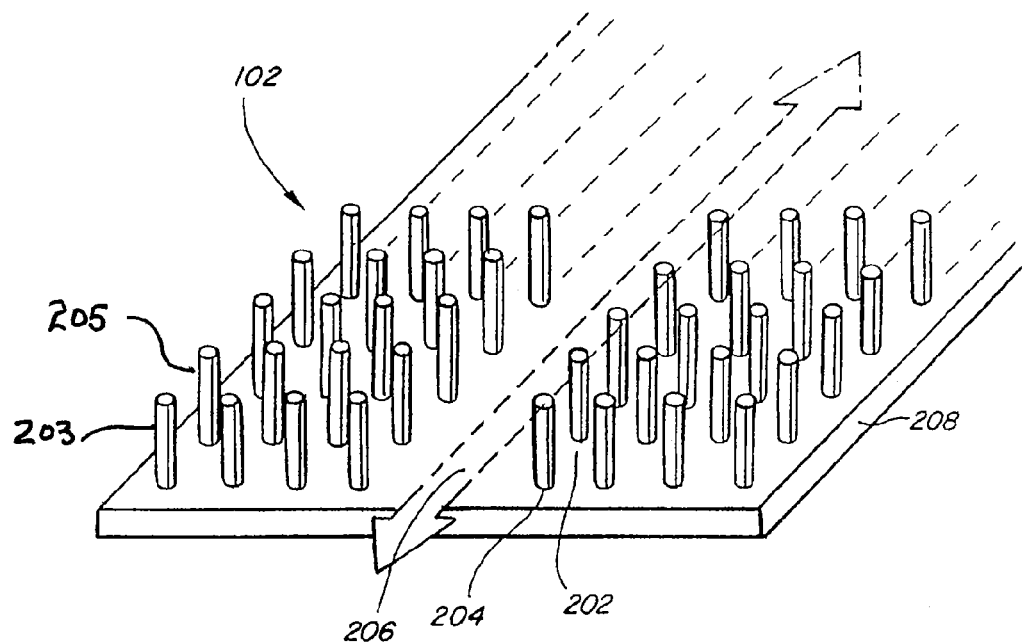
FIG. 2 is a cross section of FIG. 1 taken along the line A-A.

FIG. 2 shows the cross section of the waveguide taken along line A-A. The waveguide 102 has a perimeter that features voids 202 and silicon pillars 204. The pillars alternate in a checkerboard pattern surrounding an air filled light channel 206. The pillars have spacing approximately equal to one half the wavelength of the light (explained hereinafter) to be propagated through the light channel 206. The pillars are constructed on a photonic crystal slab substrate 208 in a multistage deposition and etching process using a silicon oxide mask or other similar process. Slab substrate 208 supports the pillars in a stable arrangement.

Alternate embodiments utilize alternating pillars of different materials. For example, the waveguide 102 may be constructed by alternating pillars of gallium arsenide and aluminum oxide. The waveguide 102 may be constructed with alternating pillars of materials having different refractive indexes. The pillars may be cylindrical in shape, or have any other shape that creates a photonic bandgap. A slab may be joined to the tops of the pillars to provide full three dimensional containment. The waveguide may be constructed by any conventional manufacturing process, including semiconductor manufacturing processes. Alternative photonic crystals using properly alternating structures of dielectric (e.g., first dielectric material 203 and second dielectric material 205) may also be used. In this case, the periodic structure is parallel to the waveguide and the waveguide itself is formed by a longitudinal defect structure. Such a photonic structure may be three dimensional effectively forming a tube waveguide in which the light waves may be guided through a longitudinal void or cavity within the crystal structure.

Figure 3:
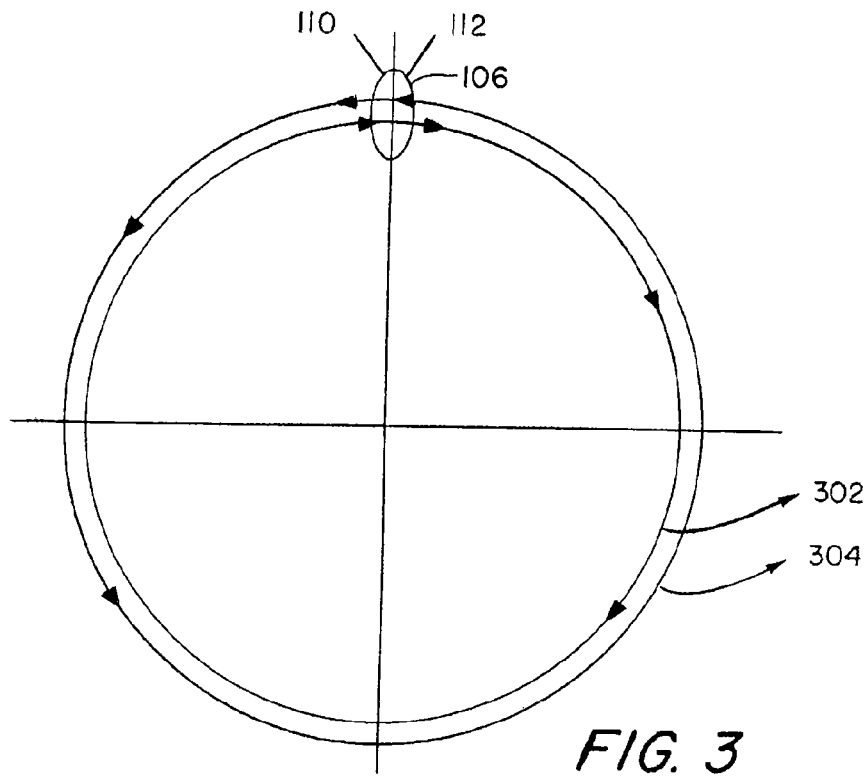
FIG. 3 is a diagram illustrating the light path in a preferred embodiment of the present invention.

FIG. 3 shows collimated light traveling through a circular embodiment of the gyroscope. The gyroscope is not rotating around an axis normal to the gyroscope (an axis coming out of the paper). Light from the first light path 110 enters the coupler 106 and is split into a clockwise rotating light beam 302 and a counterclockwise rotating light beam 304. The light travels through the light channel 206 with both light beams arriving at the coupler 106 with identical frequencies and phases. Mixed light exiting the coupler 106 through the second light path 112 will have a constant intensity.

The light traveling through the gyroscope may have a wavelength of 1550 nm in order to make light compatible with erbium doped amplifiers which allow light amplification without the need for electrical transduction. A frequency of 980 nm may also be used to allow the use of super luminous diodes as a light source. However, any convenient light frequency may be used. The use of laser light as well as collimated light is also contemplated.

Figure 4:
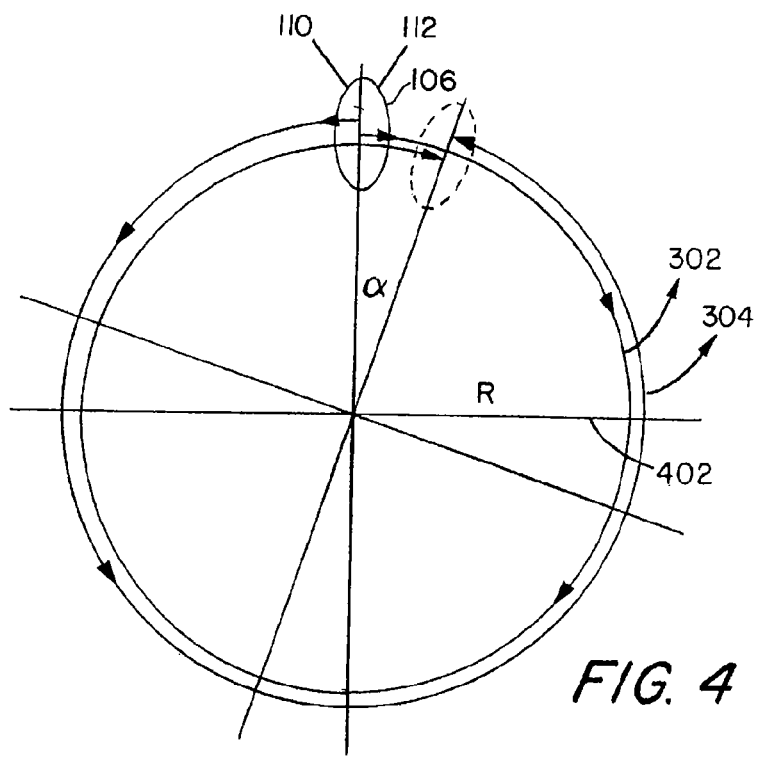
FIG. 4 is a diagram illustrating the light path when the gyroscope of FIG. 3 is rotating.

FIG. 4 shows light in a rotating gyroscope. Light from the first light path 110 enters the coupler 106 and is split into a clockwise rotating light beam 302 and a counterclockwise rotating light beam 304. As the light travels through the channel the gyroscope rotates through an angle $\alpha$. The clockwise rotating light beam 302 will travel an arc length $(2\pi+\alpha)R$ before arriving at the coupler 106 while the counterclockwise rotating light beam 304 will travel an arc length of $(2\pi-\alpha)R$. Light arriving at the coupler from the counter rotating beams will be out of phase. Mixed light departing through light path 112 will have intensity indicative of the phase difference and hence the rotation angle.

Figure 5:
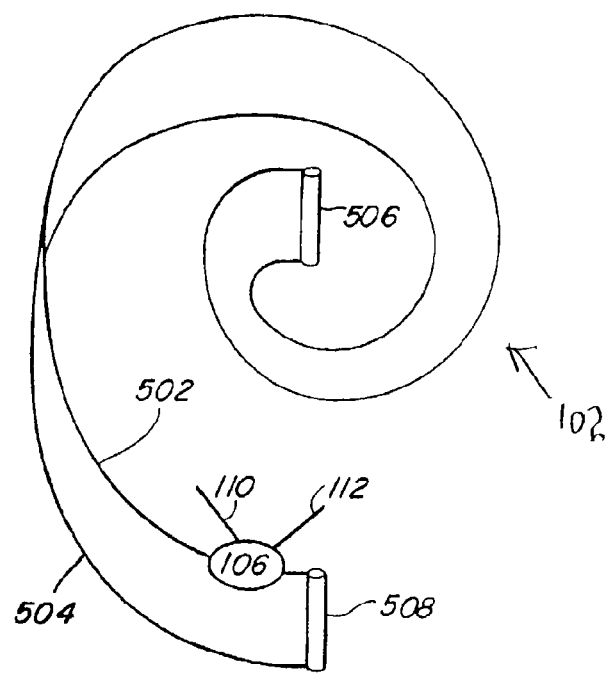
FIG. 5 is a schematic illustration of a third preferred embodiment of the invention.

FIG. 5 shows a double spiral waveguide. The waveguide 102 features two spirals connected via feed-through holes. A first spiral 502 is characterized by a monotonically decreasing radius of curvature. A second spiral 504 identical to the first spiral is located in a parallel plane. A first feed through hole 506, at one end of the first spiral 502, extends to the corresponding end of the second spiral 504. A second feed through hole 508, at the other end of the spiral 502, extends from the first spiral 502 to the second spiral 504. A coupler 106 in the first spiral 502 launches light in opposite directions. A first light path 110 guides coherent or laser light into the coupler. A second light path 112 guides light out of the coupler. Preferably the parallel planes defined by the first spiral and the second spiral are separated by a very small distance to avoid sensing rotation rates normal to the feed through holes 506 508.

Figure 6:
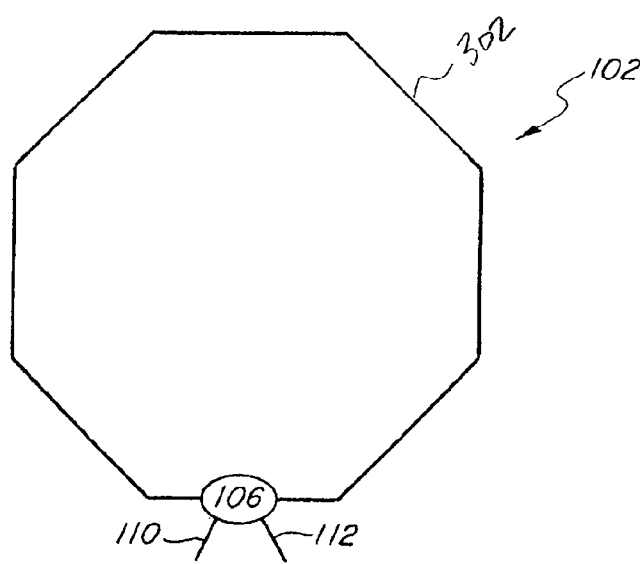
FIG. 6 is a schematic illustration of a top view of a fourth preferred embodiment of the invention.

FIG. 6 shows a polygon shaped waveguide. The waveguide 102 features a series of legs 302 joined at the edges to form a substantially octagon shaped structure. A coupler 106 interrupts one of the legs to allow ingress and egress of light. Light in the first light path 110 is coupled into the waveguide 102 through the coupler 106. Light within the waveguide is also coupled out to the second light path 112 through the coupler 106.

Figure 7:
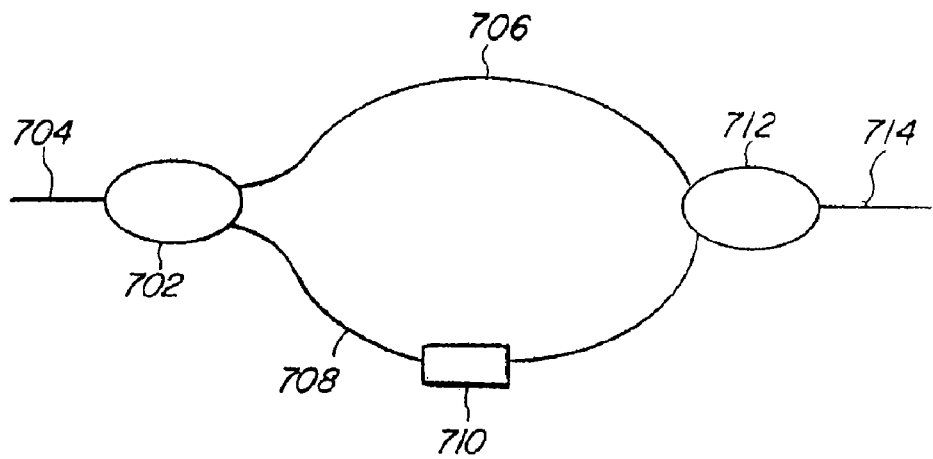
FIG. 7 is a schematic illustration of a top view of a fifth preferred embodiment of the invention.

FIG. 7 shows the waveguide of the present invention in a Mach-Zehnder configuration. A first coupler 702 splits light from an entry path 704 into a first light beam that travels along a reference light path 706 and a second light beam that travels along an interference path 708. Both light paths are photonic crystal waveguides identical in structure to the waveguide 102. They feature alternating pillars 202, 204 of materials forming photonic bandgaps that surround a light channel 206 (FIG. 2). The interference path has an adjustment device 710 in its light path. The adjustment device 710 can be adjusted to stress or distress the interference path 708, slightly increasing or decreasing the path length. The reference light path 706 and the interference path 708 terminate in a second coupler 712 that combines light from the paths. The combined light departs through an exit path 714. By using the adjustment device 710, the relative phase angles of light arriving at the second coupler can be adjusted to change the intensity of the light departing through the exit path 714.

The adjustment device 710 may be constructed of a compliant material. The waveguide then becomes a pressure sensor. The adjustment device 710 may be constructed of a material with a refractive index sensitive to electromagnetic fields, making the device an antenna. The adjustment device 710 may be a gap in the interference path, making the device a gas sensor. The adjustment device 710 may be a different structure from interference path 708, or may be just a continuation of the interference path. For example, the interference path 708 may be constructed entirely of compliant materials making the path inherently a pressure sensor.

Figure 8:
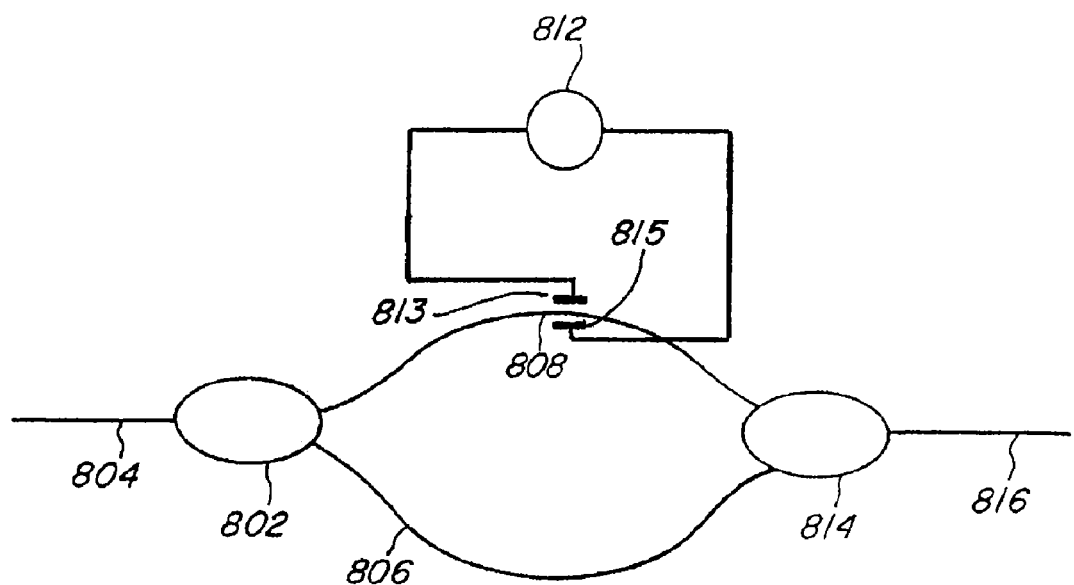
FIG. 8 is a schematic illustration of a top view of a sixth preferred embodiment of the invention.

FIG. 8 shows the waveguide of the present invention used as a light modulator. A first coupler 802 splits light from an entry path 804 into a first beam that travels through a reference light path 806 and a second beam that travels through a refraction path 808. Both light paths are photonic waveguides identical in structure to waveguide 102. They also feature alternating pillars 202, 204 of material that form photonic bandgaps around a light channel 206 (FIG. 2). At least one of the alternating pillars of material has a diffractive index sensitive to magnetic fields or electric fields. For example Lithium Niobate exhibits sensitivity to electric fields. Electrodes 813 and 815 powered by power source 812 are located near the refraction path. The reference light path 806 and the interference path 808 terminate in a second coupler 814 combining light traveling through the paths. The combined light departs through an exit path 816.

The amplitude or frequency coming from the power source 812 is adjusted to change the intensity of the electric field around electrodes 813 and 815 thereby changing the refractive index of the pillars 202 in the refraction path 808. The change in refractive index alters the path of the beam of light traveling through the refraction path modulating the mixed light departing through the exit path. Similarly, this effect may be induced with a magnetic field coil substituting for electrodes 813 and 815, and using a material whose index of refraction is sensitive to magnetic field in path 808.

What is claimed is:

1. An optical interferometer comprising:
   a first photonic waveguide having an introduction point and an end, the first photonic waveguide formed in a spiral shape and having a photonic crystal structure capable of receiving a first beam of light at the introduction point of the first photonic waveguide, the photonic crystal structure of the first photonic waveguide being a plurality of pillars, positioned transverse to a propagation of the first beam of light, and at least one crystal slab, for creating a predefined path for the first beam of light;
   a second photonic waveguide having an introduction point and an end, the second photonic waveguide formed in a spiral shape substantially concentric with the first photonic waveguide in the same plane as the first photonic waveguide, the second photonic waveguide having a photonic crystal structure capable of receiving a second beam of light at the introduction point of the second photonic waveguide, the photonic crystal structure of the second photonic waveguide being a plurality of pillars, positioned transverse to a propagation of the second beam of light, and at least one crystal slab, for creating a predefined path for the second beam of light;
   a turn at the end of the first photonic waveguide connected to the end of the second photonic waveguide; and
   a light beam combiner for receiving the first beam of light after the first beam of light travels at least a portion of the predefined path for the first beam of light, and receiving the second beam of light after the second beam of light travels at least a portion of the predefined path for the second beam of light, and combining the first beam of light and the second beam of light into one beam.

2. The optical interferometer of claim 1 further comprising a transducer for converting the combined one beam into an electrical signal.

3. The optical interferometer of claim 1 wherein the length of the second photonic waveguide is adjustable.

4. The optical interferometer of claim 1 wherein the second photonic waveguide is sensitive to a magnetic field.

5. The optical interferometer of claim 1 wherein the photonic crystal structure of the first photonic waveguide or the second photonic waveguide has predefined geometric defaults for guiding light in a particular range of wavelengths.

6. The optical interferometer of claim 1 wherein the first beam of light and the second beam of light are each produced by a light source that produces collimated or coherent light.

7. The optical interferometer of claim 1 wherein a pair of adjacent pillars of the first photonic waveguide or the second photonic waveguide have refractive indices that alternate.

8. The optical interferometer of claim 1 further comprising a compliant material, responsive to pressure, in the second photonic waveguide.

9. The optical interferometer of claim 1 further comprising a gap in the second photonic waveguide, the gap being fillable with a gas.

10. The optical interferometer of claim 1 further comprising pillars of a material that is sensitive to a magnetic or electric field in the second photonic waveguide.

11. The optical interferometer of claim 10 further comprising a power source connected to electrodes or conductors placed next to the pillars in the second photonic waveguide that are sensitive to a magnetic or electric field, and wherein variation of the amplitude or frequency of the power source modifies the second beam of light.

* * * * *

UNITED STATES PATENT AND TRADEMARK OFFICE
CERTIFICATE OF CORRECTION

PATENT NO. : 8,203,718 B2
APPLICATION NO. : 13/029059
DATED : June 19, 2012
INVENTOR(S) : Daniel A. Tazartes and Kenneth D. Marino It is certified that error appears in the above-identified patent and that said Letters Patent is hereby corrected as shown below:

Title page, Item (73) Assignee:

"Northrop Grumman Guidance and Electronic Corporation, Inc." should be

--Northrop Grumman Guidance and Electronic Company, Inc.--

Signed and Sealed this
Thirty-first Day of July, 2012

David J. Kappos
*Director of the United States Patent and Trademark Office*